US011685249B2

(12) United States Patent
Ohkuma et al.

(10) Patent No.: US 11,685,249 B2
(45) Date of Patent: Jun. 27, 2023

(54) BATTERY PACK ARRANGEMENT STRUCTURE

(71) Applicant: HONDA MOTOR CO., LTD., Tokyo (JP)

(72) Inventors: Kanae Ohkuma, Wako (JP); Christopher Lang, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 352 days.

(21) Appl. No.: 17/271,335

(22) PCT Filed: Jul. 4, 2019

(86) PCT No.: PCT/JP2019/026641
§ 371 (c)(1),
(2) Date: Feb. 25, 2021

(87) PCT Pub. No.: WO2020/044792
PCT Pub. Date: Mar. 5, 2020

(65) Prior Publication Data
US 2021/0339617 A1   Nov. 4, 2021

(30) Foreign Application Priority Data
Aug. 28, 2018   (JP) .............................. JP2018-158938

(51) Int. Cl.
*B60K 1/04*   (2019.01)
*H01M 50/209*   (2021.01)
(Continued)

(52) U.S. Cl.
CPC .................. *B60K 1/04* (2013.01); *B60K 6/40* (2013.01); *B60L 50/64* (2019.02); *B62D 21/15* (2013.01);
(Continued)

(58) Field of Classification Search
CPC .. B60K 1/04; B60K 2001/0438; B62D 25/20; H01M 50/209; H01M 50/242
See application file for complete search history.

(56) References Cited

U.S. PATENT DOCUMENTS

| | | | | |
|---|---|---|---|---|
| 5,534,364 A | * | 7/1996 | Watanabe | ........... H01M 50/244 429/150 |
| 9,083,029 B2 | * | 7/2015 | Lee | ..................... H01M 50/264 |

(Continued)

FOREIGN PATENT DOCUMENTS

| | | |
|---|---|---|
| JP | 2011-121483 A | 6/2011 |
| JP | 2013-82312 A | 5/2013 |

(Continued)

OTHER PUBLICATIONS

International Search Report dated Sep. 10, 2019, issued in counterpart application No. PCT/JP2019/026641, w/English translation (4 pages).

(Continued)

*Primary Examiner* — John D Walters
*Assistant Examiner* — James J Triggs
(74) *Attorney, Agent, or Firm* — WHDA, LLP (57) ABSTRACT

In this battery pack arrangement structure, since a case main body of a battery case is made of a metal by die-casting, not only is it possible to reduce the number of components and the weight by forming, integrally with the case main body, a cross member protruding upward from a case bottom wall and extending in the vehicle width direction and a second fixing portion protruding outward in the vehicle width direction from a case side wall, but it is also possible to enhance the side collision resistance by increasing the strength of the case main body including the cross member and the second fixing portion. Moreover, since the second fixing portion protruding outward in the vehicle width direction from the case side wall is fixed to a floor frame, due (Continued)

to the collision load of a side collision being directly transmitted from the floor frame to the cross member of the case main body and supported, it is possible to ensure the side collision resistance even when the strength of the floor frame is decreased so as to lighten the weight.

4 Claims, 7 Drawing Sheets

(51) Int. Cl.
  *H01M 50/242* (2021.01)
  *B60K 6/40* (2007.10)
  *B62D 21/15* (2006.01)
  *B62D 25/20* (2006.01)
  *B60L 50/64* (2019.01)
  *H01M 50/249* (2021.01)
  *H01M 50/271* (2021.01)

(52) U.S. Cl.
  CPC .......... *B62D 25/20* (2013.01); *H01M 50/209* (2021.01); *H01M 50/242* (2021.01); *H01M 50/249* (2021.01); *H01M 50/271* (2021.01); *B60K 2001/0438* (2013.01); *H01M 2220/20* (2013.01)

(56) References Cited

U.S. PATENT DOCUMENTS

| | | | | |
|---|---|---|---|---|
| 11,380,956 | B2* | 7/2022 | Kakimura | H01M 50/256 |
| 2011/0303395 | A1* | 12/2011 | Mori | B60K 11/04 |
| | | | | 165/104.34 |
| 2014/0246259 | A1 | 9/2014 | Yamamura et al. | |
| 2014/0284125 | A1* | 9/2014 | Katayama | B60L 58/21 |
| | | | | 180/68.5 |
| 2014/0374180 | A1 | 12/2014 | Katayama et al. | |
| 2015/0243950 | A1* | 8/2015 | Hara | H01M 50/262 |
| | | | | 429/99 |
| 2016/0099451 | A1* | 4/2016 | Murai | H01M 50/509 |
| | | | | 429/54 |
| 2016/0226112 | A1* | 8/2016 | Maskew | B60L 3/0084 |
| 2016/0347183 | A1 | 12/2016 | Kusumi et al. | |
| 2018/0294450 | A1* | 10/2018 | Haag | H01M 50/271 |
| 2021/0179188 | A1* | 6/2021 | Berels | B60L 50/66 |
| 2021/0339617 | A1* | 11/2021 | Ohkuma | B62D 25/20 |

FOREIGN PATENT DOCUMENTS

| | | |
|---|---|---|
| JP | 2014-19260 A | 2/2014 |
| JP | 2014-24359 A | 2/2014 |
| JP | 2016-220475 A | 12/2016 |
| JP | 2017-226353 A | 12/2017 |
| WO | 2013/084936 A1 | 6/2013 |

OTHER PUBLICATIONS

International Preliminary Report on Patentability (Form PCT/IPEA/409) of International Application No. PCT/JP2019/026641 dated Oct. 6, 2020. (10 pages).

Written Opinion dated Sep. 10, 2019, issued in counterpart application No. PCT/JP2019/026641 (4 pages).

Reply to Written Opinion of PCT/JP2019/026641 dated Sep. 10, 2019, w/English translation (12 pages).

* cited by examiner

FIG.6

BATTERY PACK ARRANGEMENT STRUCTURE

TECHNICAL FIELD

The present invention relates to a battery pack arrangement structure in which a battery pack housing a drive-use battery for driving an electric vehicle in an interior of a case main body and a cover is disposed in a lower part of a vehicle body.

BACKGROUND ART

An arrangement in which a recess part that extends in the vehicle width direction and is downwardly recessed is formed in a cover of a battery case housing a battery for driving an electric vehicle, and due to a floor cross member of a vehicle body being fitted into the recess part from above the battery case is disposed at a high position to thus ensure minimum ground clearance while avoiding interference with the floor cross member is known from Patent Document 1 below.

PRIOR ART DOCUMENTS

Patent Documents

Patent Document 1: Japanese Patent Application Laid-open No. 2017-226353

SUMMARY OF THE INVENTION

Problems to be Solved by the Invention

In the conventional arrangement, since the battery case is formed from a press-formed steel plate and a vertical frame fixed along a side wall of the battery case is fastened to a side sill of the vehicle body by means of a bolt, if an attempt is made to enhance the side collision resistance of the battery case, it becomes necessary to reinforce the battery case by means of a reinforcing member or provide an impact-absorbing part in the interior of the side sill, thereby causing an increase in the number of components and an increase in the weight, which is a problem.

The present invention has been accomplished in light of the above circumstances, and it is an object thereof to enhance the side collision resistance of a battery pack while avoiding any increase in the number of components and the weight.

Means for Solving the Problems

In order to attain the above object, according to a first aspect of the present invention, there is provided a battery pack arrangement structure in which a battery pack housing a drive-use battery for driving an electric vehicle in an interior of a case main body and a cover is disposed in a lower part of a vehicle body, wherein the vehicle body comprises left and right floor frames extending in a fore-and-aft direction, and a front-side first floor cross member and rear-side second floor cross member connecting the left and right floor frames in a vehicle width direction, the case main body is made of a metal by die-casting and has a cross member formed integrally therewith, the cross member protruding upward from a case bottom wall and extending in the vehicle width direction, a first fixing portion provided on the cross member is fixed to the second floor cross member, a second fixing portion protruding outward in the vehicle width direction from the case side wall and fixed to the floor frame is formed integrally with the case main body, and a recess portion recessed toward the cross member is formed in the cover, the recess portion and the second floor cross member at least partially overlapping one another when viewed in an up-and-down direction.

Further, according to a second aspect of the present invention, in addition to the first aspect, a raised portion covering an electrical component disposed in an upper part of the drive-use battery protrudes upward from the cover, and the raised portion is disposed between the first floor cross member and the second floor cross member.

Furthermore, according to a third aspect of the present invention, in addition to the first or second aspect, the case rear wall is positioned further forward than a front end part of the fuel tank or a front end part of a rear subframe. Moreover, according to a fourth aspect of the present invention, in addition to any one of the first to third aspect, a downwardly opening space is formed in an outer face of the case side wall by means of the pair of front and rear second fixing portions and a linking wall having an L-shaped cross section extending along the case side wall so as to link the second fixing portions.

A battery module 34 of an embodiment corresponds to the drive-use battery of the present invention.

Effects of the Invention

In accordance with the first aspect of the present invention, the battery pack housing the drive-use battery for driving an electric vehicle in the interior of the case main body and the cover is disposed in a lower part of the vehicle body.

Since the case main body is made of a metal by die-casting, not only is it possible to reduce the number of components and the weight by forming, integrally with the case main body, the cross member protruding upward from the case bottom wall and extending in the vehicle width direction and the second fixing portion protruding outward in the vehicle width direction from the case side wall, but it is also possible to enhance the side collision resistance by increasing the strength of the case main body including the cross member and the second fixing portion.

Moreover, since the second fixing portion protruding outward in the vehicle width direction from the case side wall is fixed to the floor frame, due to the collision load of a side collision being directly transmitted from the floor frame to the cross member of the case main body and supported, it is possible to ensure the side collision resistance even when the strength of the floor frame is decreased so as to lighten the weight; since the recess portion recessed toward the cross member is formed in the cover, and the recess portion and the second floor cross member at least partially overlap one another when viewed in the up-and-down direction, it is possible to dispose the battery pack at a high position while avoiding interference with the second floor cross member and ensure a minimum ground clearance for the vehicle.

Furthermore, in accordance with the second aspect of the present invention, since the raised portion covering the electrical component disposed in an upper part of the drive-use battery protrudes upward from the cover, and the raised portion is disposed between the first floor cross member and the second floor cross member, it is possible to mount the battery pack having the raised portion on the vehicle body while avoiding interference with the first and second floor cross members.

Moreover, in accordance with the third aspect of the present invention, since the case rear wall is positioned further forward than the front end part of the fuel tank or the front end part of the rear subframe, it is possible to make sure that the battery pack does not protrude rearward, thus ensuring the comfort of a rear seat. Further, in accordance with the fourth aspect of the present invention, when the vehicle is involved in a side collision and the collision load is inputted into the case main body of the battery case from the floor frame, the space collapses, thus enabling the collision energy to be absorbed effectively.

EXPLANATION OF REFERENCE NUMERALS AND SYMBOLS

15 Floor frame
16 First floor cross member
17 Second floor cross member
21 Battery pack
23 Fuel tank
31 Case main body
31a Case bottom wall
31c Case rear wall
31d Case side wall
31e Cross member
31f First fixing portion
31g Second fixing portion
32 Cover
32a Recess portion
32d Raised portion
32e Raised portion
34 Battery module (drive-use battery)
35 Electrical component

MODES FOR CARRYING OUT THE INVENTION

An embodiment of the present invention is explained below by reference to FIG. 1 to FIG. 7. In the present specification, the fore-and-aft direction, the left-and-right direction (vehicle width direction) and the up-and-down direction are defined with reference to an occupant seated on a driver's seat.

First Embodiment

Figure 1:
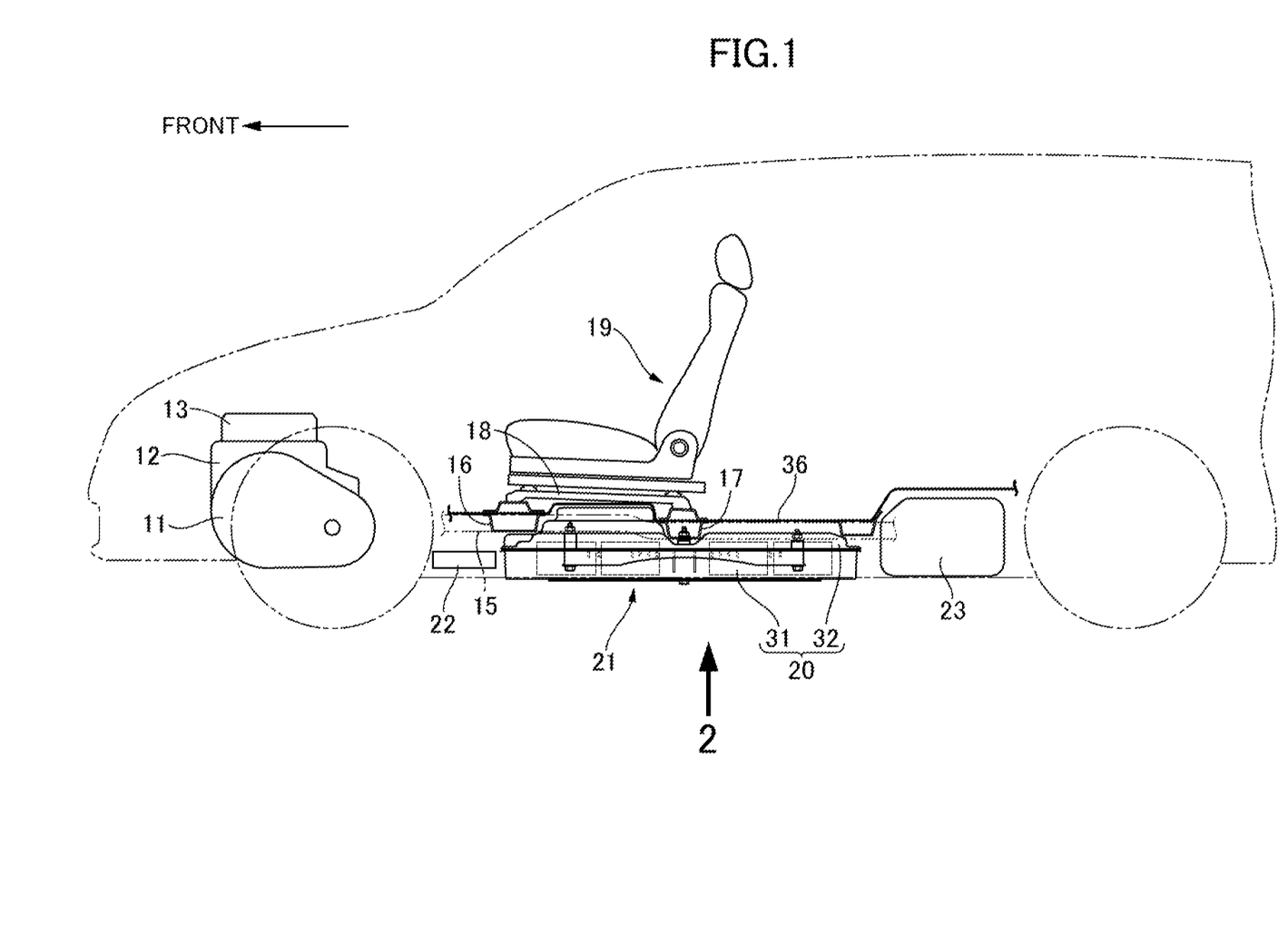
FIG. 1 is a side view of a vehicle body of a plug-in hybrid vehicle. (first embodiment)
Figure 2:
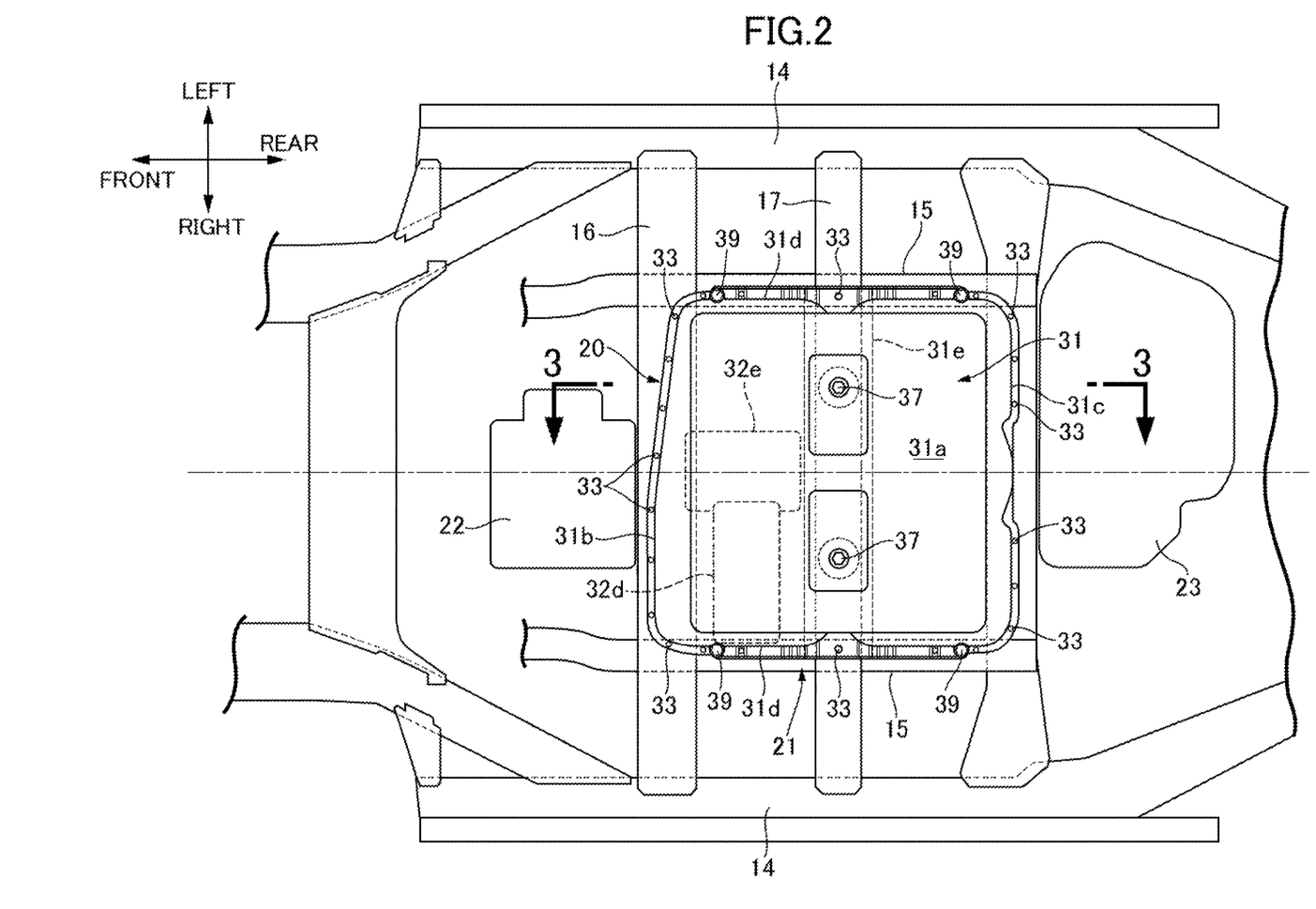
FIG. 2 is a view in the direction of arrow 2 in FIG. 1. (first embodiment)
Figure 4:
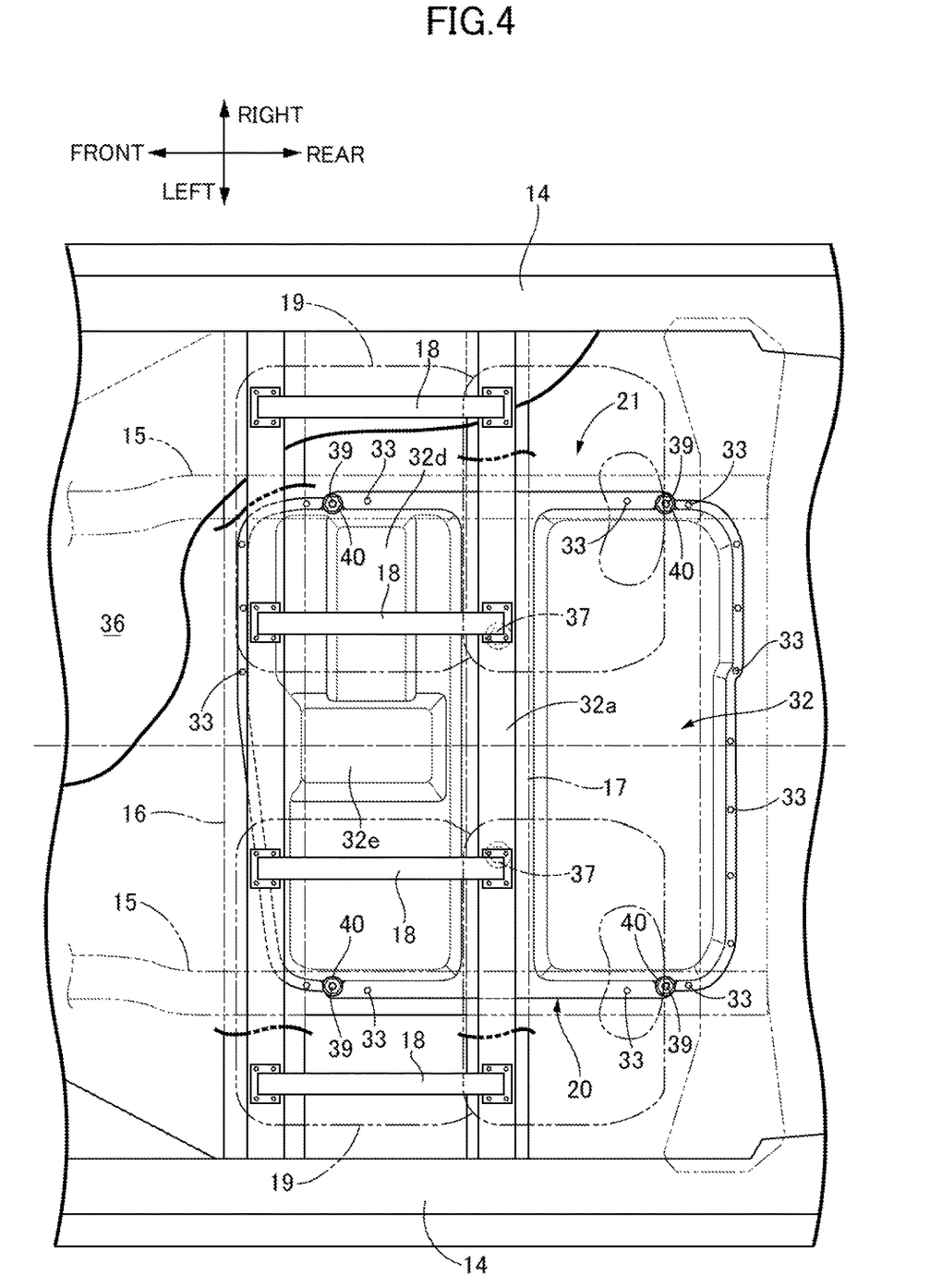
FIG. 4 is a view from arrowed line 4-4 in FIG. 3. (first embodiment)
Figure 5:
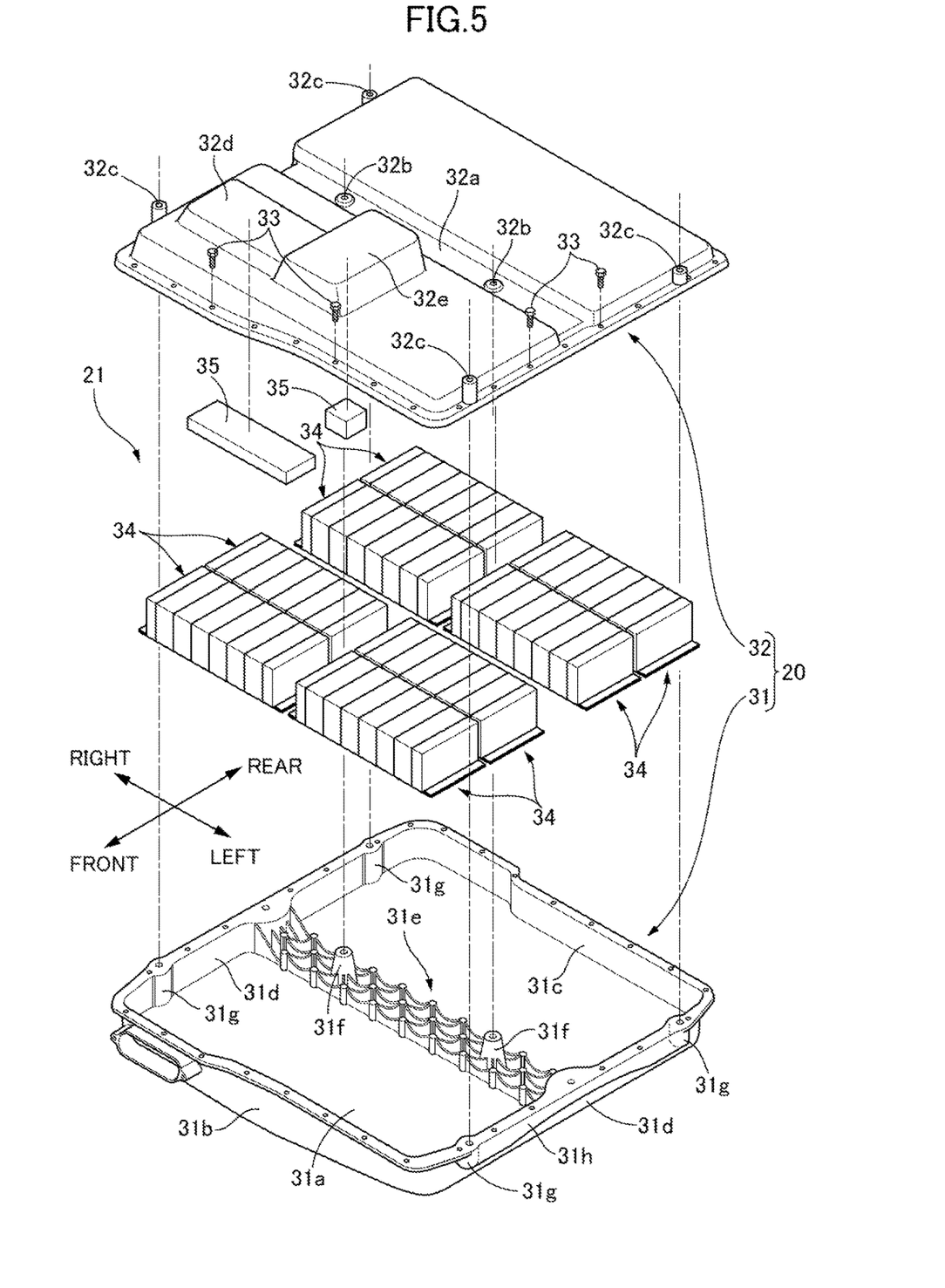
FIG. 5 is an exploded perspective view of a battery pack. (first embodiment)
Figure 6:
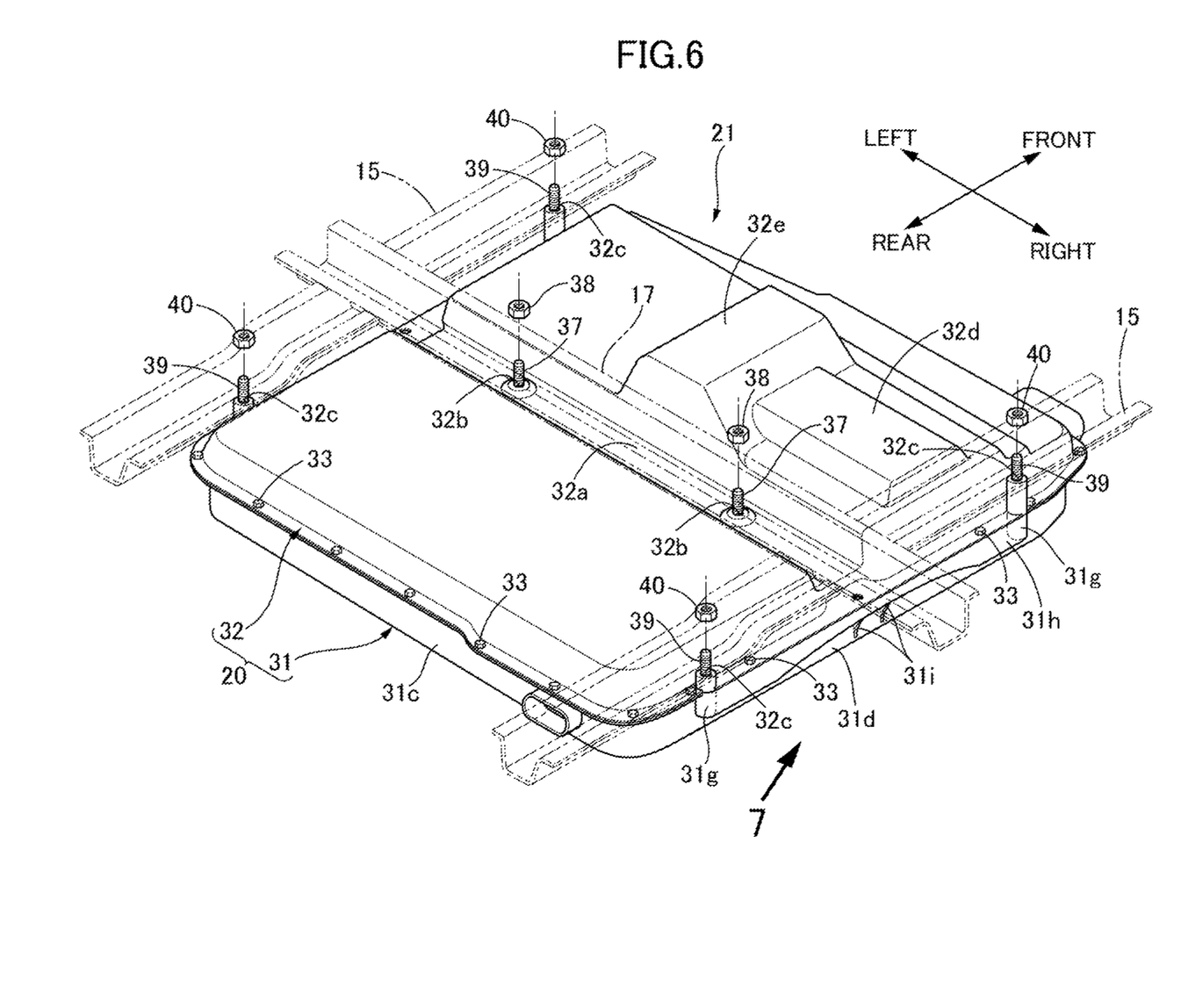
FIG. 6 is a perspective view showing a state in which the battery pack is mounted. (first embodiment)
Figure 7:
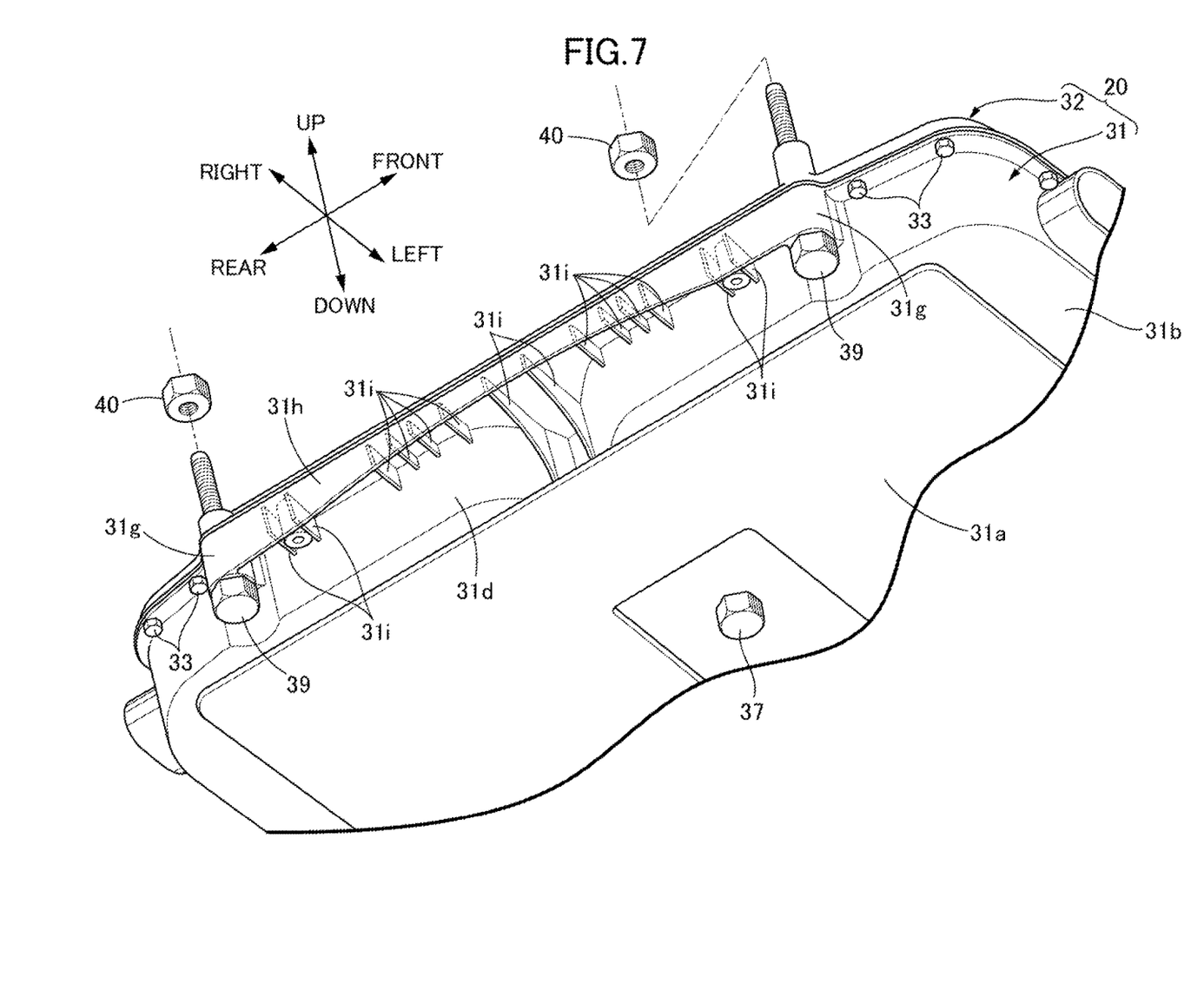
FIG. 7 is a view in the direction of arrow 7 in FIG. 6. (first embodiment)

As shown in FIG. 1, FIG. 2 and FIG. 4, mounted on a vehicle body front part of a front wheel drive plug-in hybrid vehicle are an electric motor 11 for driving a front wheel, an engine 12 for driving a generator charging a battery, and a power drive unit 13 equipped with an inverter controlling the drive of the electric motor 11.

A pair of left and right side sills 14 extending in the fore-and-aft direction are disposed on left and right side parts in the middle of the vehicle body, a pair of left and right floor frames 15 extending in the fore-and-aft direction are disposed on the inner side, in the vehicle width direction, of the left and right side sills 14, front parts of the left and right side sills 14 and the left and right floor frames 15 are connected by means of a first floor cross member 16 extending in the vehicle width direction, and intermediate parts, in the fore-and-aft direction, of the left and right side sills 14 and the left and right floor frame 15 are connected by means of a second floor cross member 17 extending in the vehicle width direction. The first floor cross member 16 and the second floor cross member 17 are connected by means of a plurality of seat rails 18 extending in the fore-and-aft direction, and a front seat 19 is supported on the seat rails 18.

A battery pack 21 housing the battery for driving the electric motor 11 within a battery case 20 is supported on lower faces of the left and right floor frame 15 and the second floor cross member 17. Disposed on the front side of the battery pack 21 is a charger 22 (or a non-contact type charging pad) that is connected to an external power supply via a charging cable and charges the battery, and disposed on the rear side of the battery pack 21 is a fuel tank 23 storing fuel for driving the engine 12.

As shown in FIG. 2 to FIG. 7, the battery case 20 is formed from an upwardly opening case main body 31 made of a metal (aluminum) by die-casting and a downwardly opening cover 32 made of a metal (aluminum) by die-casting, in which outer peripheral parts thereof are joined in the up-and-down direction by means of a plurality of bolts 33. Eight battery modules 34 are mounted in a bottom part of the case main body 31, and an electrical component 35 such as a battery control device, a junction board or a cell voltage sensor is disposed in an upper part of the case main body 31.

The case main body 31, which has a shallow container shape, includes a substantially flat case bottom wall 31a, a case front wall 31b, case rear wall 31c, and left and right case side walls 31d that rise from the outer periphery of the case bottom wall 31a, and a cross member 31e connecting the left and right case side walls 31d in the vehicle width direction. The cross member 31e of the present embodiment is an assembly of a large number of ribs rising from the case bottom wall 31a (see FIG. 5), but it can have any structure. A pair of left and right cylindrical first fixing portions 31f are formed on the cross member 31e of the case main body 31, and front and rear pairs of cylindrical second fixing portions 31g are formed integrally with the case main body 31 on outer faces in the vehicle width direction of the left and right case side walls 31d. The front and rear pairs of second fixing portions 31g are connected via a linking wall 31h having an L-shaped cross section and extending in parallel to the case side wall 31d. As a result, a downwardly opening space is formed so as to be surrounded by the case side wall 31d, the pair of second fixing portions 31g and the linking wall 31h, and a plurality of ribs 31i connecting the case side wall 31d and the linking wall 31h are formed within the space.

With regard to the cover 32 of the battery case 20, a downwardly recessed groove-shaped recess portion 32a is formed at a position corresponding to the cross member 31e of the case main body 31, a pair of bolt holes 32b overlapping the pair of first fixing portions 31f of the case main body 31 are formed in the recess portion 32a, and a pair of bolt holes 32c overlapping the pair of second fixing portions 31g of the case main body 31 are formed in left and right outer walls of the cover 32 in the vehicle width direction. Raised portions 32d, 32e housing the electrical component 35 are provided in a front part of the cover 32 so as to project upward.

Figure 3:
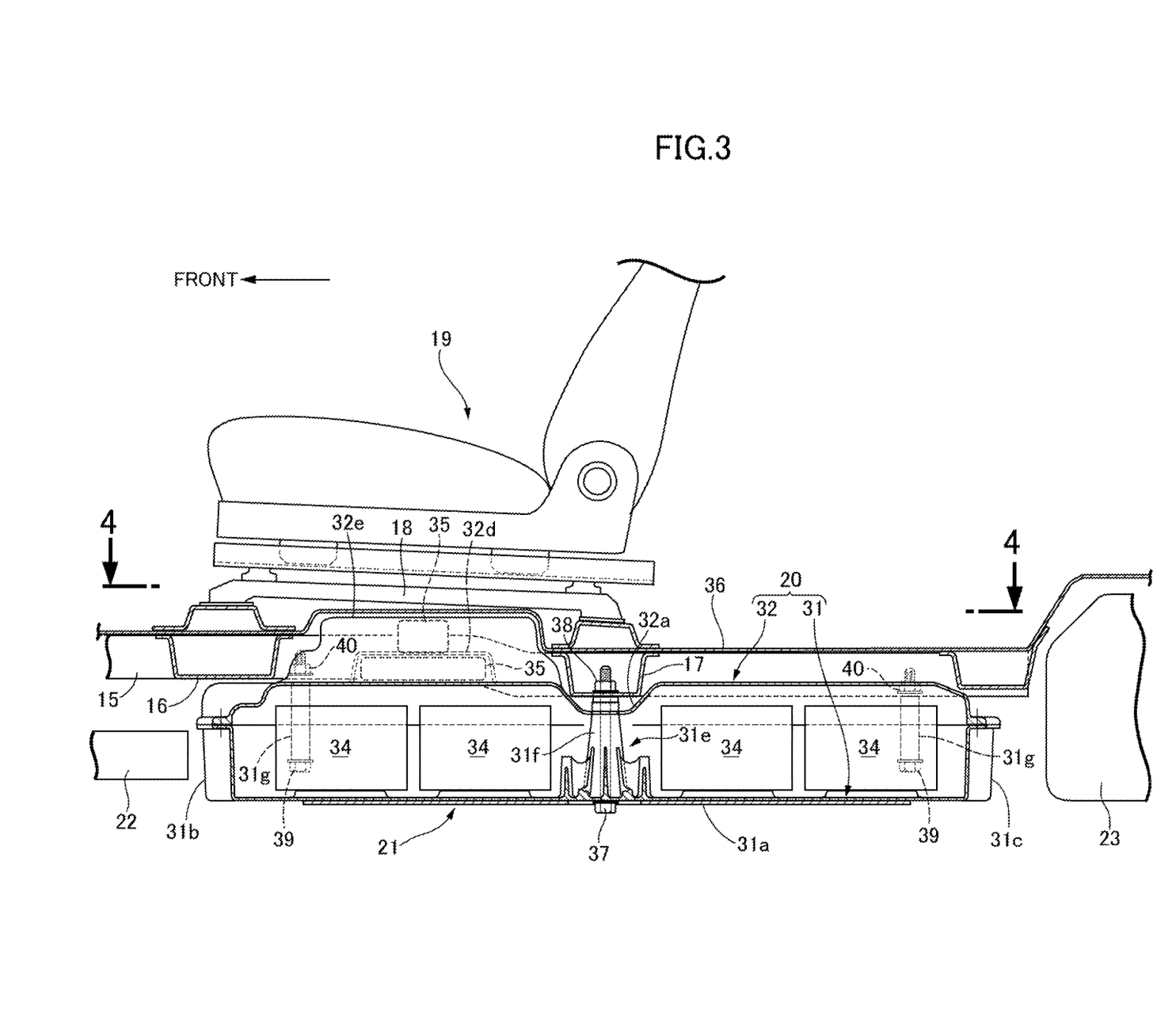
FIG. 3 is a sectional view along line 3-3 in FIG. 2. (first embodiment)

The second floor cross member 17 fixed to a lower face of a vehicle body floor 36 overlaps the cross member 31e of the case main body 31 and the recess portion 32a of the cover 32 when viewed in the up-and-down direction (see FIG. 3).

The battery case 20 thus arranged is fixed to the lower face of the vehicle body floor 36 by screwing two bolts 37 extending upward from below through the two left and right first fixing portions 31f of the case main body 31 and the two left and right bolt holes 32b of the cover 32 into two nuts 38 provided on an upper face of the first floor cross member 16 and screwing two bolts 39 extending upward from below through the two second fixing portions 31g on each of the left and right of the case main body 31 and the two bolt holes 32c on each of the left and right of the cover 32 into two nuts 40 provided on an upper face of each of the left and right floor frames 15.

The operation of the embodiment of the present invention having the above arrangement is now explained.

Since the battery case 20 formed from the case main body 31 and the cover 32 is made of a metal by die-casting, not only is it possible to reduce the number of components and the weight by forming the first and second fixing portions 31f, 31g integrally with the case main body 31, but it is also possible to enhance the side collision resistance by increasing the strength of the case main body 31 while minimizing any increase in the number of components and the weight due to the cross member 31e being formed integrally with the case main body 31.

That is, since the two front and rear second fixing portions 31g and the linking wall 31h formed into a plane shape opposing the case side wall 31d and linking the two second fixing portions 31g in the fore-and-aft direction are formed integrally with the case side wall 31d, opposing the floor frame 15, of the case main body 31 of the battery case 20, when the vehicle is involved in a side collision and the collision load is inputted into the case main body 31 of the battery case 20 from the floor frame 15, the space bounded by the two second fixing portions 31g, the linking wall 31h and the case side wall 31d collapses, thus enabling the collision energy to be absorbed effectively.

In this arrangement, since the outer end in the vehicle width direction of the second fixing portion 31g is positioned further inside in the vehicle width direction than the outer end in the vehicle width direction of the floor frame 15, it is possible, by preferentially supporting the collision load of the side collision by means of the floor frame 15 and by making the collision load that could not be supported be received by the battery case 20, to minimize any damage to the battery case 20.

Furthermore, since the second fixing portion 31g and the linking wall 31h are formed integrally with the case main body 31, which is made of a metal by die-casting, not only is it possible to reduce the number of components, but it is also possible to enhance the stiffness of the case main body 31 by means of the second fixing portion 31g and the linking wall 31h. Moreover, since the case main body 31 includes, between the two second fixing portions 31g, the rib 31i linking the case side wall 31d and the linking wall 31h in the vehicle width direction, it is possible to further enhance the side collision resistance by reinforcing the second fixing portion 31g and the linking wall 31h by means of the rib 31i.

Furthermore, since the second fixing portion 31g protruding outward in the vehicle width direction from the case side wall 31d of the case main body 31 is fixed to the floor frame 15 by means of the bolt 39 and the nut 40, due to the collision load of the side collision being directly transmitted from the floor frame 15 to the cross member 31e of the case main body 31 and supported, it is possible to ensure the side collision resistance even when the strength of the floor frame 15 is decreased so as to lighten the weight; since the recess portion 32a recessed downward toward the cross member 31e of the case main body 31 is formed in the cover 32 of the battery case 20, and the recess portion 32a and the second floor cross member 17 of the vehicle body overlap one another when viewed in the up-and-down direction, it is possible to dispose the battery case 20 at a high position while avoiding interference with the second floor cross member 17 and ensure a minimum ground clearance for the vehicle.

Moreover, the raised portions 32d, 32e housing the electrical component 35 such as a battery control device, a junction board or a cell voltage sensor are formed on the upper face of the cover 32 of the battery case 20, and since the raised portions 32d, 32e are disposed between the first floor cross member 16 and the second floor cross member 17 when viewed in the up-and-down direction, it is possible to mount the battery case 20 having the raised portions 32d, 32e on the vehicle body while avoiding interference with the first and second floor cross members 16, 17.

Furthermore, since the case rear wall 31c of the battery case 20 is positioned further forward than a front end part of the fuel tank 23, it is possible to make sure that the battery case 20 does not protrude rearward, thus ensuring the comfort of a rear seat.

An embodiment of the present invention is explained above, but the present invention may be modified in a variety of ways as long as the modifications do not depart from the subject matter.

For example, a rear subframe may be provided at the position of the fuel tank 23, and the case rear wall 31c of the case main body 31 may be positioned further forward than a front end part of the rear subframe.

Furthermore, in the embodiment both the case main body 31 and the cover 32 of the battery case 20 are made of a metal by die-casting, but the cover 32 is not necessarily made of a metal by die-casting.

The invention claimed is:

1. A battery pack arrangement structure in which a battery pack housing a drive-use battery for driving an electric vehicle in an interior of a case main body and a cover is disposed in a lower part of a vehicle body,
wherein the vehicle body comprises left and right floor frames extending in a fore-and-aft direction, and a front-side first floor cross member and rear-side second floor cross member connecting the left and right floor frames in a vehicle width direction,
the case main body is made of a metal by die-casting and has a cross member formed integrally therewith, the cross member protruding upward from a case bottom wall and extending in the vehicle width direction, a first fixing portion provided on the cross member is fixed to the second floor cross member, a second fixing portion protruding outward in the vehicle width direction from the case side wall and fixed to the floor frame is formed integrally with the case main body, and a recess portion recessed toward the cross member is formed in the cover, the recess portion and the second floor cross member at least partially overlapping one another when viewed in an up-and-down direction.

2. The battery pack arrangement structure according to claim 1, wherein a raised portion covering an electrical component disposed in an upper part of the drive-use battery protrudes upward from the cover, and the raised portion is disposed between the first floor cross member and the second floor cross member.

3. The battery pack arrangement structure according to claim 1, wherein the case rear wall is positioned further forward than a front end part of the fuel tank or a front end part of a rear subframe.

4. The battery pack arrangement structure according to claim 1, wherein a downwardly opening space is formed in an outer face of the case side wall by means of the pair of front and rear second fixing portions and a linking wall having an L-shaped cross section extending along the case side wall so as to link the second fixing portions.

* * * * *